May 12, 1970 D. L. LINDER 3,512,095

CRYSTAL DISCRIMINATOR WITH UNSYMMETRICAL DRIVE

Filed Nov. 8, 1967

Inventor
DONALD L. LINDER

BY Mueller, Aichele & Rauner

ATTYS.

United States Patent Office 3,512,095
Patented May 12, 1970

3,512,095
CRYSTAL DISCRIMINATOR WITH UNSYMMETRICAL DRIVE

Donald L. Linder, Chicago, Ill., assignor to Motorola, Inc., Franklin Park, Ill., a corporation of Illinois Filed Nov. 8, 1967, Ser. No. 681,318
Int. Cl. H03d *3/16*
U.S. Cl. 329—117 5 Claims

ABSTRACT OF THE DISCLOSURE

A crystal discriminator incorporates a pair of crystals tuned to different frequencies to change a frequency modulated signal to an amplitude modulated signal wherein the amplitude modulation is proportional to the frequency modulation. The crystal discriminator handles wide deviation signals in which the deviation approaches the pole-zero spacing of the crystals. Unsymmetrical drive circuits couple the signal to the crystals to achieve linearity without the use of inductance.

BACKGROUND OF THE INVENTION

In crystal discriminators which use a pair of crystals as the resonant circuits, the deviation which can be handled by the discriminator is limited because of the limitation on the pole-zero spacing of the crystals used. When the deviation of the FM signal approaches the pole-zero spacing of the crystals the distortion increases to a value which is not acceptable.

Crystals have been made with low capacitance in order to increase the pole-zero spacing of the crystal. However, increasing the pole-zero spacing of the crystal by decreasing the capacitance of the crystal increases the sensitivity of the crystal to circuit capacitance. When the crystal is coupled to a circuit, the capacitance of the circuit added to the capacitance of the crystal decreases the pole-zero spacing of the crystal. Thus there is a limitation on the maximum pole-zero spacing which can be obtained.

In order to provide a discriminator having the capability of detecting an FM signal with a large deviation, inductance has been incorporated in the circuit to counteract the capacitance of the crystal. However, where the crystal discriminator is part of an electronic system using integrated circuits, it is desirable to eliminate the inductance as it is not possible, in the present state of the art, to integrate the inductance. If inductance is used with an integrated circuit structure, a large part of the advantage of the integrated structure is lost due to the large physical size of the coils used to provide the inductance.

SUMMARY OF THE INVENTION

It is, therefore, an object of this invention to provide a crystal discriminator in which a frequency modulated signal, having a deviation which approaches the pole-zero spacing of the crystal can be detected with low distortion.

In practicing this invention a crystal discriminator is provided having a pair of crystals tuned to different frequencies. In order to detect the frequency modulated signal with little distortion the drive signal applied to the crystals and the bandwidth of the frequency response of the crystals are made unequal. The drive signal to the high frequency crystal is applied through a voltage divider circuit to reduce the drive signal to the high frequency crystal to a value lower than the drive signal applied to the low frequency crystal. The series resistance coupling the drive signal to the low frequency crystal is made larger than the series resistance coupling the drive signal to the high frequency crystal in order to increase the bandwidth of the frequency response of the low frequency crystal. By properly reducing the magnitude of the drive signal to the high frequency crystal and increasing the series resistance of the low frequency crystal the frequency response curve of the discriminator is substantially linear.

The invention is illustrated in the drawings of which:

DESCRIPTION OF THE INVENTION

Figure 1:
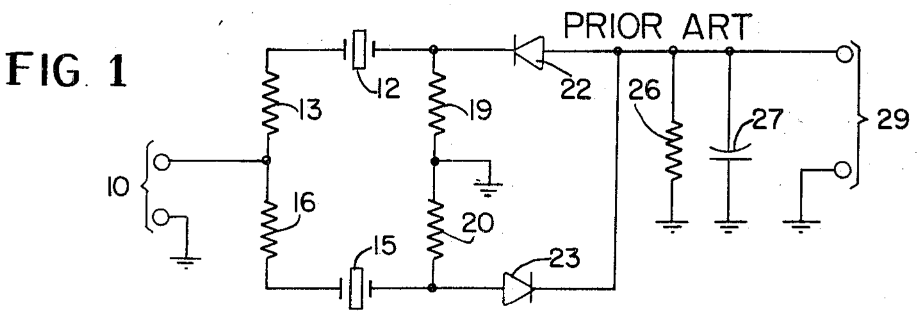
FIG. 1 is a schematic showing a prior art discriminator circuit using a pair of crystals as the resonant circuit.

In FIG. 1 there is shown a prior art discriminator using a pair of crystals to form the resonant circuits required by the discriminator. A frequency modulated signal is received at terminals 10 and is applied through resistors 13 and 16 to crystals 12 and 15 respectively. Crystals 12 and 15 are resonant at different frequencies and the output signals from the crystals are developed across resistors 19 and 20. The output signals are rectified by rectifiers 22 and 23 respectively and combined across resistor 26, filtered by capacitor 27 and coupled to output terminals 29.

Figures 2, 3:
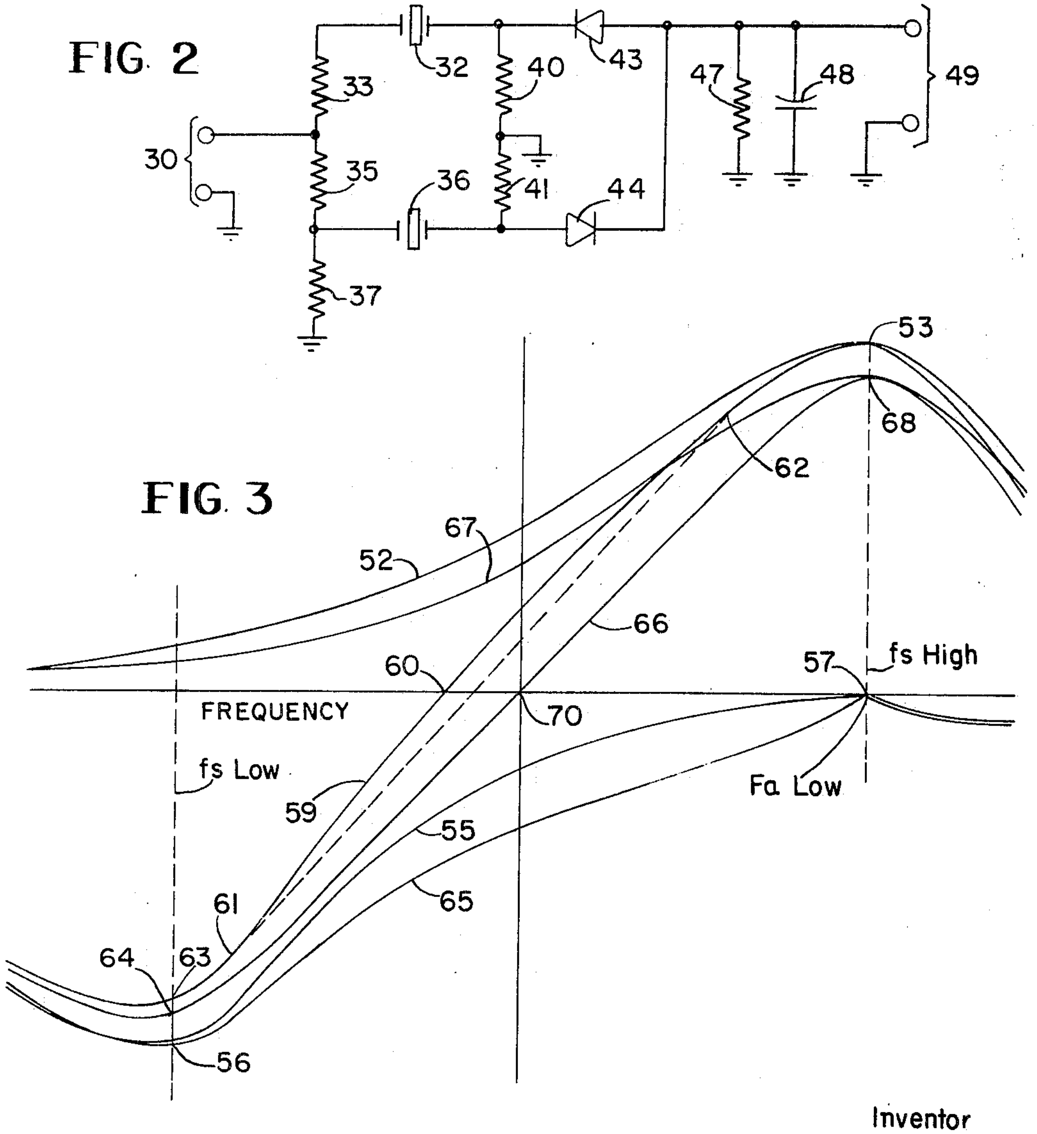
FIG. 2 is a schematic showing a crystal discriminator incorporating the unsymmetrical drive features of this invention.
FIG. 3 is a set of curves showing the improvement in linearity achieved by using unsymmetrical drive.

In FIG. 2 there is shown a schematic of a circuit incorporating the features of this invention. The frequency modulated signal applied to input terminals 30 is coupled to crystal 32 through resistor 33 and is coupled to crystal 36 through the voltage divider consisting of resistors 35 and 37. The output signal from crystals 32 and 36 is developed across resistors 40 and 41 respectively. The output signals are rectified by rectifiers 43 and 44 and combined across resistor 47, filtered in capacitor 48 and applied to output terminals 49.

In FIG. 1 resistors 13 and 16 have the same value so that the drive signals to crystals 12 and 15 are the same. In FIG. 3 curve 52 represents the detected output of crystal 15 of FIG. 1 and curve 55 represents the detected output of crystal 12 of FIG. 1. Curve 59 represents the combined output from rectifiers 22 and 23. Since curves 52 and 55 are not symmetrical about the series resonant axes of the crystals the resulting combined output, represented by curve 59, is non-symmetrical. Curve 59 passes through the zero output line at point 60 and not at point 70 which is the center frequency of the FM signal. The peak amplitudes of the output voltage, point 53 and point 63 on curve 59 are unequal. As can be seen the portion of curve 59 between points 61 and 62 has a curvature which causes distortion in the output signal.

Referring to FIGS. 2 and 3, resistor 33, which is in series with crystal 32, is made larger than the resistance of resistor 37 in parallel with resistor 35 which is the resistance in series with crystal 36. This increase in the series resistance coupled to crystal 32 increases the bandwidth of the frequency response of the crystal. The frequency response of crystal 32 is shown as curve 65 of FIG. 3, which has a wider bandwidth than curve 55. The drive signal from terminals 30 is coupled to crystal 36 of FIG. 2 through a voltage divider consisting of resistors 35 and 37. This reduces the signal coupled to crystal 36 below that coupled to crystal 32 as can be seen from curve 67.

Curve 66 represents the combined output from rectifiers 43 and 44. By properly adjusting the series resistance of crystals 32 and 36, and the drive signal to crystal 36, curve 66 can be made linear. The peak amplitudes 64, and 68 of curve 66, are substantially equal. The curve passes through point 70 which is the center frequency of the FM signal. Curve 66 is substantially linear so that the output signal at terminals 49 is substantially free from distortion.

In an example of a discriminator having the features of ıis invention, the circuit components had the following alues:

.esistor 33—2.7K ohms
.esistor 35—1.2K ohms
.esistor 37—1.0K ohms
.esistors 40, 41—2.2K ohms
.esistor 47—47K ohms
'apacitor 48—.0012 mfd.

'he center frequency of the FM signal applied to this ircuit was 8,000.000 kHz. with a deviation of ±5 kHz. 'he series resonant frequency of crystal 32 was 7,991.500 Hz. and the series resonant frequency of crystal 36 was ,007.250 kHz.

What I claim is:

1. A crystal discriminator for detecting a frequency ıodulated signal having a particular center frequency, ıcluding in combination, a first crystal resonant at a first :equency less than said center frequency and a second rystal resonant at a second frequency greater than said enter frequency, input circuit means adapted to receive ıe frequency modulated signal and including a first ranch coupled to said first crystal for applying a first requency modulated drive signal thereto and a second ranch coupled to said second crystal for applying a second frequency modulated drive signal thereto, said first nd second branches including first and second resistance ıeans respectively, at least a portion of which is conected in series with said first and second crystals for reguıting the bandwidth of the circuits including said first nd second crystals, said resistance means having values ıch that the bandwidth of the circuit including said first rystal is greater than the bandwidth of the circuit includıg said second crystal, said resistance means further egulating the magnitude of said first and second drive ignals such that said first drive signal is greater than said econd drive signal, said first and second crystals being esponsive to said first and second drive signals respecively to develop first and second output signals therefrom, ›utput circuit means coupled to said first and second rystals for detecting and combining said first and second utput signals to develop a signal of varying amplitude ›roportional to the modulation of the frequency moduated signal, the relative bandwidth of said first and sec›nd circuits and the relative magnitude of said first and econd drive signals being chosen so that said signal of 'arying amplitude is substantially linear with respect to he modulation of the frequency modulated signal.

2. A crystal discriminator for detecting a frequency nodulated signal having a particular center frequency, in:luding in combination, a first crystal resonant at a first requency less than said center frequency and a second rystal resonant at a second frequency greater than said enter frequency, input circuit means adapted to receive he frequency modulated signal and including first resist.nce means coupled to said first crystal for applying a fre[uency modulated drive signal thereto and second resistınce means coupled to said second crystal for applying ı second frequency modulated drive signal thereto, said first and second resistance means providing resistance in series with said crystals to increase the bandwidth thereof and having values such that the bandwidth of the circuit including said first crystal is greater than the bandwidth of the circuit including said second crystal, said first and second resistance means further acting to regulate the magnitude of said first and second drive signals respectively whereby the magnitude of said first drive signal is greater than the magnitude of said second drive signal, said first and second crystals being responsive to said first and second drive signals respectively to develop first and second output signals therefrom, output circuit means coupled to said first and second crystals for detecting and combining said first and second output signals to develop a signal of varying amplitude proportional to the modulation of the frequency modulated signal, the values of said first and second resistance means being chosen so that said signal of varying amplitude is substantially linear with respect to the modulation of the frequency modulated signal.

3. The crystal discriminator of claim 2 wherein, said input circuit means includes input terminals adapted to receive the frequency modulated signal, said first resistance means coupling said input terminals to said first crystal for applying said first drive signal thereto, and said second resistance means includes first and second resistors connected to form a voltage divider circuit, said voltage divider circuit coupling said input terminals to said second crystal for applying said second drive signal thereto.

4. The crystal discriminator of claim 3 wherein, said first resistance means is connected in series with said first crystal and said first resistor of said second resistance means is connected in series with said second crystal, the resistance of said first resistance means being greater than the resistance of said first resistor whereby the bandwidth of the circuit including said first crystal is greater than the bandwidth of the circuit including said second crystal.

5. The crystal discriminator of claim 4 wherein, said output circuit means includes output terminals, first rectifying means coupling said first crystal to said output terminals, and second rectifying means coupling said second crystal to said output terminals, said first and second rectifying means having opposite polarities and acting to rectify and combine said first and second output signals to develop said signal of varying amplitude.

References Cited

UNITED STATES PATENTS

| | | | |
|---|---|---|---|
| 2,374,735 | 5/1945 | Crosby | 329—141 X |
| 3,074,021 | 1/1963 | Rullman | 329—119 X |
| 3,170,121 | 2/1965 | Ho et al. | 329—117 |
| 3,199,040 | 8/1965 | Coogan | 329—117 |

ALFRED L. BRODY, Primary Examiner

U.S. Cl. X.R.

307—233; 325—349; 329—141, 198